US006507826B1

(12) United States Patent
Maners

(10) Patent No.: US 6,507,826 B1
(45) Date of Patent: Jan. 14, 2003

(54) REMOTE ELECTRONIC INVOICE ENTRY AND VALIDATION SYSTEM AND METHOD THEREFOR

(75) Inventor: Graham S. Maners, Boca Raton, FL (US)

(73) Assignee: Koriel, Inc., Boca Raton, FL (US)

( * ) Notice: Subject to any disclaimer, the term of this patent is extended or adjusted under 35 U.S.C. 154(b) by 0 days.

(21) Appl. No.: 09/240,454

(22) Filed: Jan. 29, 1999

(51) Int. Cl.$^7$ .............................................. G06F 17/60
(52) U.S. Cl. ........................................ 705/34; 705/40
(58) Field of Search ............................. 705/30, 34, 64, 705/75, 40

(56) References Cited

U.S. PATENT DOCUMENTS

| | | | | |
|---|---|---|---|---|
| 5,812,669 A | * | 9/1998 | Jenkins et al. ................. | 705/75 |
| 6,029,150 A | * | 2/2000 | Kravitz ........................... | 705/39 |
| 6,058,380 A | * | 5/2000 | Anderson et al. .............. | 705/40 |
| 6,205,437 B1 | * | 3/2001 | Gifford .......................... | 705/39 |

FOREIGN PATENT DOCUMENTS

EP          370146          *  5/1990

OTHER PUBLICATIONS

*Informationweek* article "New Life for EDI?", dated Mar. 17, 1997.*
*Datamation* article "EDI and the NET: A profitable partnering", dated Apr. 1997.*
*Network Magazine* article "EDI takes to the Internet", dated Oct. 1998.*
*TMA Journal* article, "Re–engineering A/P and purchasing at Wachovia" (v 17, ISSN: 1080–1162. pp. 10–16), Jul./Aug. 1997.*
*Corporate Cashflow* article "Capture remittance data to streamline receivables processing", pp 27–29, Oct. 1993.*
MicroEDI brochure, copyright 1997, Koriel, Inc.
IAPP, Reduce Your Cost, Improve Your Service With Micro-EDI, Feb.–Mar. 1998, pp. 6–7.
Info World, Apr. 6, 1998, vol. 20, Issue 14, pp. 66, 74–78, 82–83.

* cited by examiner

*Primary Examiner*—Dean J. Kramer
(74) *Attorney, Agent, or Firm*—Christopher & Weisberg P.A.

(57) ABSTRACT

An invoice processing system (200) includes a web browser equipped computer system (210) operated by a vendor that is Internet networkly coupled to an invoice processing server (202) providing a web page server. The vendor can enter invoice information (216) at the invoice processing server (202) to create an invoice at the invoice processing server. The invoice processing server (202) validates the invoice information (216) and determines the invoice is authorized for processing payment. The invoice processing server (202) provides a payment authorization signal to an accounting computer system (206) to initiate processing payment of the invoice in response to determining the invoice is authorized for payment.

19 Claims, 8 Drawing Sheets

FIG. 4

MICRO EDI by KORIEL

| INVOICE INQUIRY | | | | HELP |
|---|---|---|---|---|

| | | | ADD | VIEW | LOGOUT |
|---|---|---|---|---|---|
| INVOICE NO. | DATE | ORDER NO. | AMOUNT | STATUS | |
| ⊙ W888999 | 04/20/1998 | 0 | 127.00 | POSTED | |
| ○ Z112233 | 04/20/1998 | 77888 | 178.00 | INCOMPLETE | |
| ○ R222-666 | 04/20/1998 | 0 | 375.00 | READY FAX | |
| ○ X22333 | 04/20/1998 | 80703 | 100.00 | OPER HOLD | |
| ○ W444777 | 04/20/1998 | 0 | 4500.00 | REFUSED | |
| ○ 777 | 05/06/1998 | 77888 | 110.00 | INCOMPLETE | |

FIG. 5

MICRO EDI by KORIEL

| ORDERS AVAILABLE FOR INVOICING | HELP |
|---|---|

OPEN ORDERS
- ⊙ C77888
- ○ C78085
- ○ C78116
- ○ C80695
- ○ C80703

NO ORDER NO. PROVIDED
USE SELECTED ORDER NO.
EXIT

FIG. 6

MICRO EDI by KORIEL

| INVOICE HEADER | | | HELP |
|---|---|---|---|
| ORDER NO: C77888 | UPDATE | DELETE | EXIT |
| INVOICE NO: Z112233 | | | |
| INVOICE DATE: 04/20/1998 | | | |
| SALES TAX: 22.50 | | | |
| SHIPPING/HANDLING: 41.50 | | | |
| INVOICE TOTAL: 178.00 | | | |
| DESTINATION ZIP: 33432 | | | |

FIG. 7

MICRO EDI by KORIEL

| ORDER LINES AVAILABLE FOR INVOICING | | | | | HELP |
|---|---|---|---|---|---|
| | | | USE SELECTED LINE NO. | | EXIT |
| • | • | PART NO. | DESCRIPTION | QTY | UNIT PRICE | TOTAL |
| ⦿ | 1 | 23XXR | PC SYSTEM BOX | 1.00 | "100.00 | 100.00 |
| ○ | 2 | UST123 | MONITOR | 1.00 | "100.00 | 100.00 |
| ○ | 4 | 23XXY | NETWORK CARD | 1.00 | "100.00 | 100.00 |
| ○ | 5 | 1010XR | TRACKBALL MOUSE | 1.00 | "100.00 | 100.00 |
| ○ | 6 | 23UPC12 | UPC MODEL 400 | 1.00 | "100.00 | 100.00 |
| ○ | 7 | 23VV | WIN NT v4.0 | 1.00 | "100.00 | 100.00 |
| ○ | 8 | 23UUS | BACKUP EXEC | 1.00 | "100.00 | 100.00 |
| ○ | 9 | 23&*( | MODEM | 1.00 | "100.00 | 100.00 |
| ○ | 3 | 23XRY | NETWORK CARD | 1.00 | "100.00 | 100.00 |

FIG. 8

MICRO EDI by KORIEL

| INVOICE HEADER | | HELP |
|---|---|---|

ORDER NO: CO  UPDATE  DELETE  EXIT

INVOICE NO: R222-666
INVOICE DATE: 04/20/1998
SALES TAX: 13.50
SHIPPING/HANDLING: 45.00
INVOICE TOTAL: 375.50
DESTINATION ZIP: 33432

AUTHORIZED BY

NAME: BONNIE MURPHY
DATE: 01/14/1998
PHONE NO: 3056667777    EXAMPLE_PHONE:5613610800
FAX NO: 3035999222    EXAMPLE_FAX:5613610803

FIG. 9

MICRO EDI INVOICE LINE    HELP

UPDATE    EXIT

THIS LINE DELIVERS A:  ⦿ PRODUCT  ○ SEVICE  ○ SHIPPING/HANDLING

PART/PRODUCT NO: Q85544
DISCRIPTION: TEST LINE ITEM

SERIAL NO: G4433
QUANTITY: 1.00
(X) UNIT PRICE: 600.00
= NET PRICE: $600.00

ACCOUNTING CODES
DIVISION: 1
GROUP: 1
DEPARTMENT: 1
GL CODE: 1

902

REMOTE ELECTRONIC INVOICE ENTRY AND VALIDATION SYSTEM AND METHOD THEREFOR

FIELD OF THE INVENTION

This invention relates in general to electronic data interchange (EDI) systems, and more specifically to a method and apparatus for remotely and electronically entering invoices and for validating said invoices in an invoice processing system.

BACKGROUND OF THE INVENTION

For about ten years businesses have attempted to widely implement a technology called Electronic Data Interchange (EDI) with little success. EDI is an electronic data communication process allowing businesses to electronically exchange documents. Successful EDI systems reduce the amount of paper documents a business receives and processes, which in turn reduces the need for clerical overhead and consequently reduces overall transaction costs.

EDI has had a very limited acceptance in the marketplace to date. Typically, EDI consists of a host company investing hundreds of thousands, or millions, of dollars to bring an EDI system on line. Once available, host companies, unfortunately, have only been able to persuade a very small percentage of their vendors to participate in the EDI document exchange process. The main reasons for this include the following. EDI remains very expensive for most companies to implement, mainly do to its complex implementation. Therefore, only the largest of companies can afford to implement a full EDI system.

Further, because EDI is so technically complicated to support, only companies with well developed technical staff and computer systems can support the requirements of a conventional EDI implementation. Furthermore, because, EDI traditionally has been costly to implement, only companies with very large volumes of documents to handle can justify the large costs, which precludes a very large number of smaller businesses from considering an EDI implementation. Additionally, EDI is a closed loop system implementation requiring close integration between a client's accounting computer system and a vendor's accounting computer system. Consequently, the integration between a client's accounting computer system and a vendor's accounting computer system has been difficult, requiring virtually a custom accounting computer interface between the client and each of its vendors. For these reasons, and others, many companies have been reluctant to implement EDI systems. In a real world example, a company had spent upwards of 2 million dollars to implement an EDI computer system, but after five years of development had only five out of thirty thousand (30,000) vendors communicating via the EDI implementation. Although EDI originally was intended to reduce transactional costs and make it easy to integrate between client and vendor computer systems, in actuality, the prohibitive costs to implement and support a conventional EDI system have kept most companies from utilizing EDI implementations in their financial transactions.

An exemplary prior art EDI system is shown in FIG. 1. Company 1, in this example, communicates with Company 2 via a proprietary EDI value added network 102. This value added network 102 requires specialized equipment and customized interfacing between each pair of companies to effect communication of electronic documents utilizing EDI implementation. Conventional EDI systems normally require at each company interface to the value added network a translation of document format between an EDI proprietary communication format and the company's internal proprietary document format for its accounting computer system.

In a typical transaction, Company 1 creates a purchase order 104, packages the purchase order document in EDI format, at step 106, as required by a particular vendor company (Company 2), and then Company 1 uploads the document into the value added network 102 via a Company 1 EDI value added network interface site 108. The document then travels across the value added network 102 until it arrives at a Company 2 EDI value added network site interface 110. Company 2 then translates the document received, at step 112 from the EDI format into the internal proprietary document format required by Company 2's accounting computer system. Company 2 then creates a purchase order document, at step 114, and delivers the ordered product, at step 116. Then Company 2 creates an account receivable invoice at step 118. Company 2 then packages its internally created invoice document into an EDI format, at step 120, and uploads the document into the value added network 102 via the Company 2's EDI value added network site 122. The document then travels through the value added network 102 and arrives at Company 1's EDI value added network site, at step 124.

Company 1 then translates the received document, at step 126, from the EDI format to the Company 1 internal document format for Company 1's accounting computer system. Company 1 then creates an accounts payable invoice document, at step 128 from the translated EDI format document. Company 1's accounting computer system then updates its purchase order system, at step 130, to reconcile the received invoice information with a purchase order information that may have been originally created by Company 1.

If Company 1's system determines that there is a match between invoice information received and a purchase order information originally created by Company 1, then Company 1's accounting computer system authorizes payment, at step 132, to forward a payment to a particular vendor that sent the invoice information. Company 1's accounting computer system then prepares an accounts payable document confirming payment authorization and packages the document in EDI format and uploads the document into the value added network 102 via a Company 1 EDI value added network site 134. This electronic document then travels through the value added network 102 until it arrives at Company 2's EDI value added network site, at step 136. Company 2's accounting computer system then translates the EDI formatted document, at step 138, into its internal document format for its accounting computer system. Subsequently, Company 2's accounting computer system, at step 140, updates its internal accounts receivable records to reconcile between the invoice information that Company 2's accounts receivable created, at step 118, with the payment authorization confirmation document received from Company 1.

As can been seen, from this sequence of steps to affect a single transaction between Company 1 and Company 2, the conventional EDI implementation suffers from a number of evident draw backs. First, it requires communication via a proprietary and complex value added network 102 for all transaction documents. Second, Company 1 and Company 2 must repeatedly translate documents from an internal accounting document format to/from a customized EDI format packaged from the other company. This format interchange tends to be customized and very particular between Company 1 and Company 2's accounting computer systems. Additional companies would require similar additional customization to be able to communicate documents between Company 1 and/or Company 2. Further, the technical complexity and customization required to interface Company 1's accounting computer system to Company 2's accounting computer system via the EDI value added network through interface sites significantly burdens each company's technical resources to the point that it makes EDI implementation prohibitively expensive for most companies, except for the most technically sophisticated and well financed large companies.

Thus, there exists a need for an alternative invoice processing system that can fulfill the original promises of EDI for standard and efficient document communication while maintaining the cost of implementation affordable for most companies.

BRIEF DESCRIPTION OF THE DRAWINGS

FIGS. 4 through 9 illustrate six exemplary display screens for the invoice processing system of FIG. 2.

DESCRIPTION OF THE PREFERRED EMBODIMENT

The present invention solves the problems with the prior art EDI invoice processing system implementations by utilizing the power of a standard wide area network, such as the Internet and the world wide web as well as the power of Intranets within companies. An Intranet within a company can take on characteristics of a local area network (LAN) or of a wide area network (WAN) depending on the particular application for a particular company. Another significant aspect of the present invention, which is not known in the prior art, comprises an application server, such as a web application server or other network server that can handle applications, physically residing at a company's place of business. Preferably, a web application server operates on a standard personal computer physically residing at a company's place of business. This preferred application server that can process invoices between a vendor and a client company's accounting system will be hereinafter referred to as a MicroEDI Server.

Figure 1:
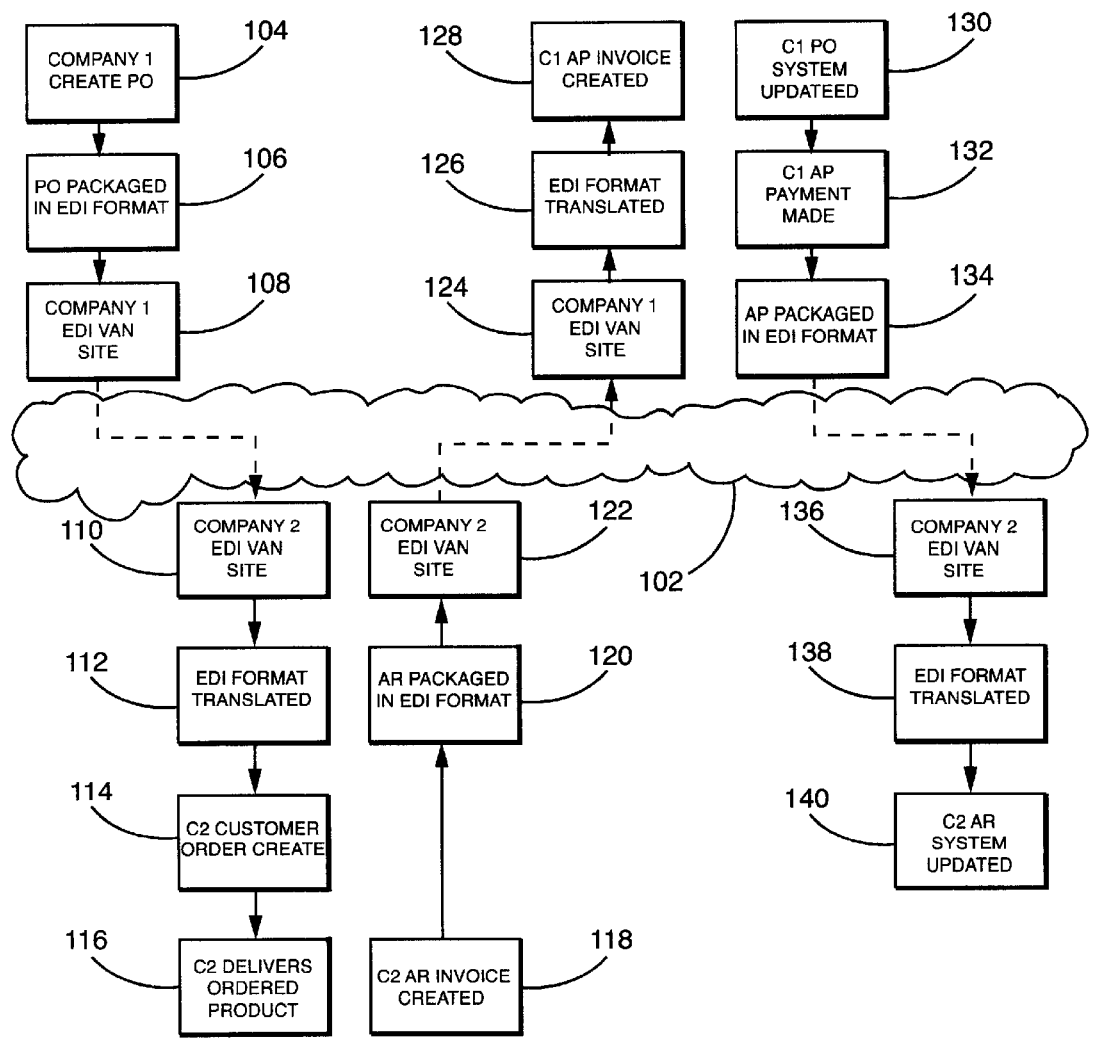
FIG. 1 is an operational flow diagram of a prior art EDI invoice processing system.
Figure 2:
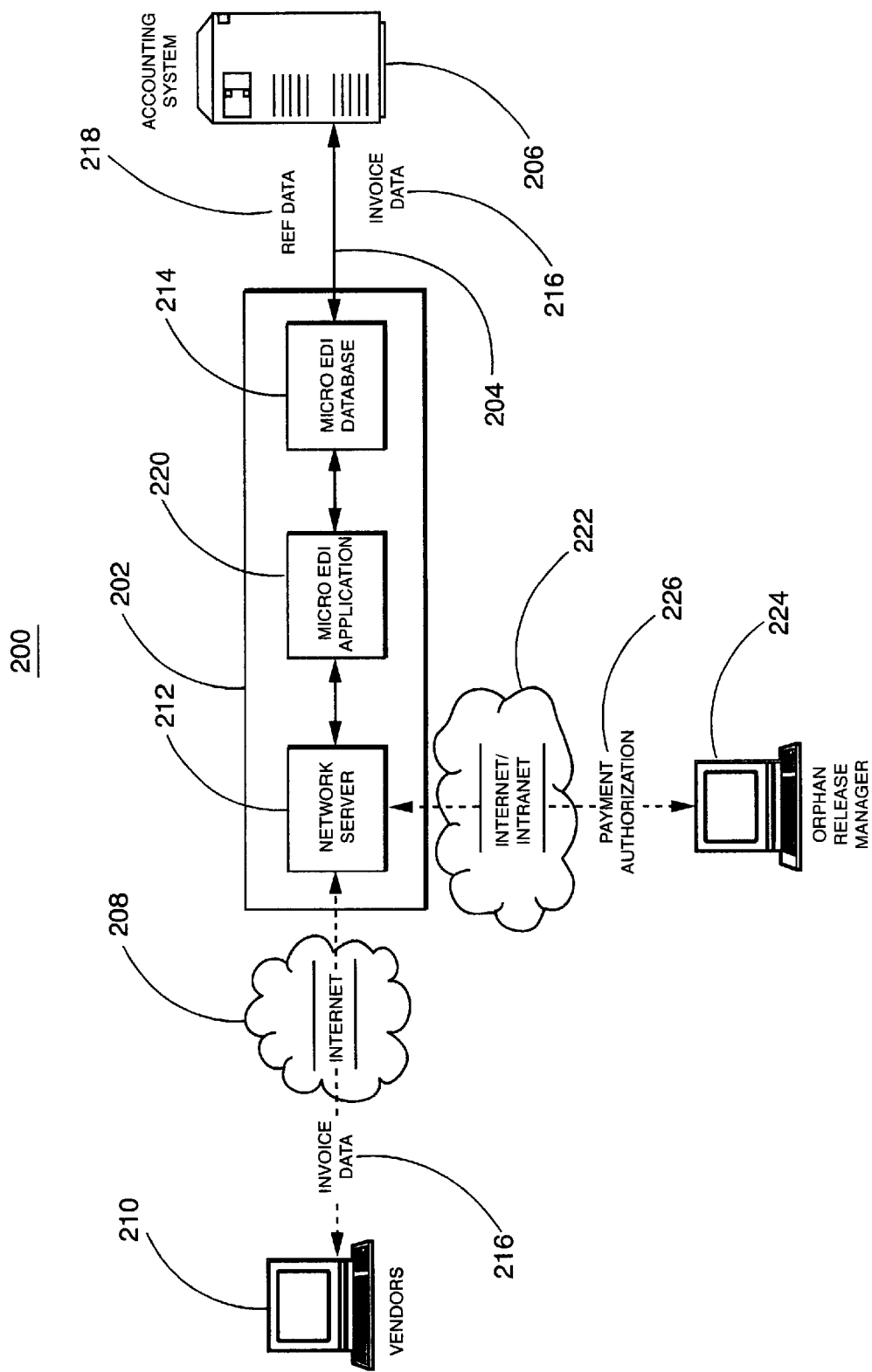
FIG. 2 is a functional block diagram of an invoice processing system in accordance with a preferred embodiment of the present invention.

A preferred embodiment of the present invention, utilizing a MicroEDI Server, is illustrated in FIG. 2. The invoice processing system 200 comprises a MicroEDI Server 202 electrically coupled, such as via a local area network 204, with a company's computer system 206 that handles the accounting functions for a company. The MicroEDI Server 202, in a preferred embodiment, is networkly coupled via the Internet 208 with a computer system 210 located at a place of business for one of the company's vendors. In the preferred embodiment, the computer system 210 at the vendor site comprises a standard personal computer operating with a web browser application.

Figure 10:
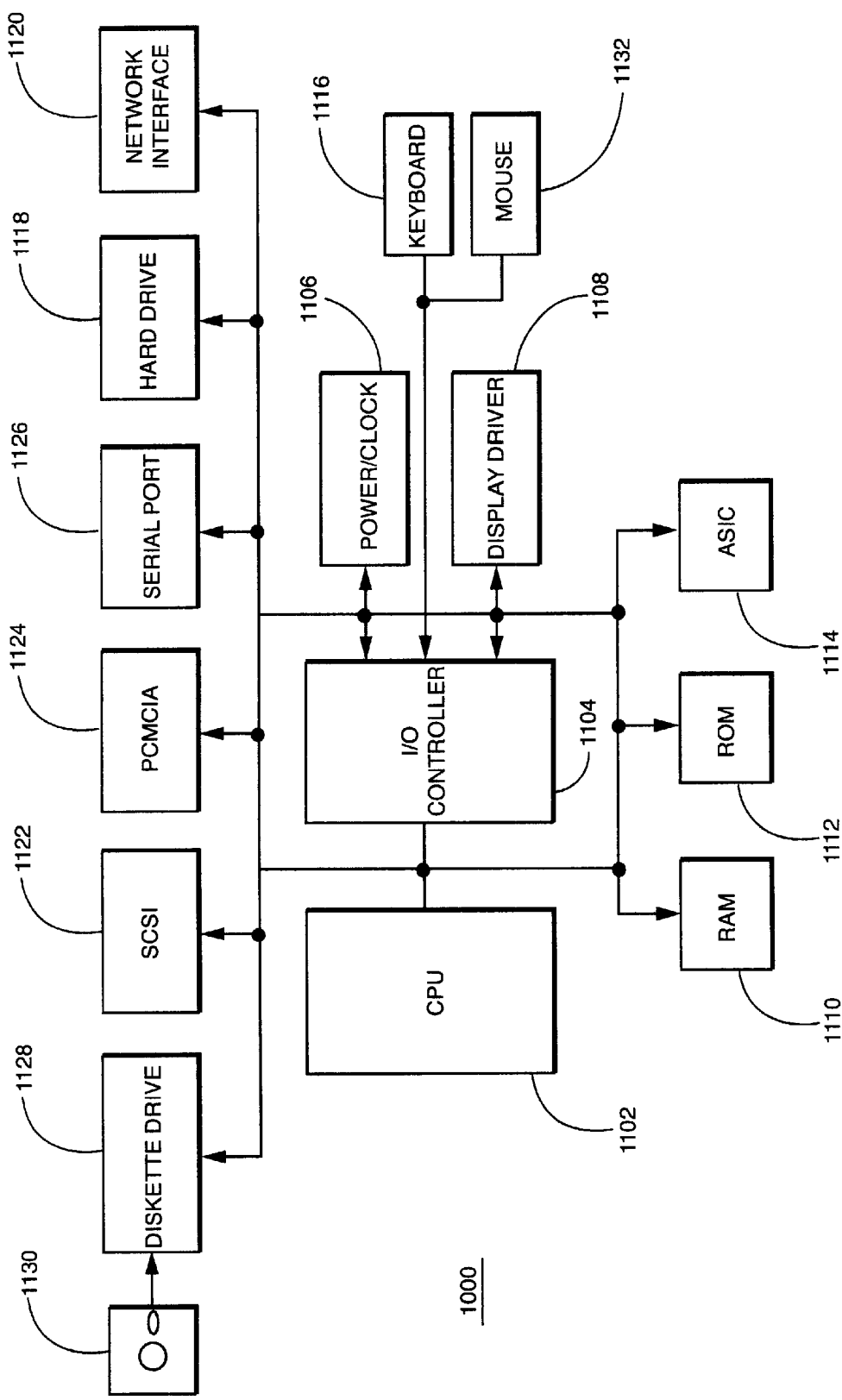
FIG. 10 is a functional block diagram of a computer system according to the preferred embodiment of the present invention.

Referring to FIG. 10, there is shown a block diagram of the major electrical components of a preferred computer system 1000 to provide a computing platform for the invoice processing server 202 (FIG. 2) in accordance with a preferred embodiment of this invention. The electrical components include: a central processing unit (CPU) 1102, an Input/Output (I/O) Controller 1104, a system power and clock source 1106; display driver 1108; RAM 1110; ROM 1112; ASIC (application specific integrated circuit) 1114 and a hard disk drive 1118. A keyboard 1116 with a mouse 1132 receives the user input. Other pointing devices besides a mouse 1132 can be substituted such as a trackball, joystick, glidepad, TrackPoint, and touch screen. These are representative components of a computer system 1000. The general operation of a computer system 1000 comprising these elements is well understood. Network interface 1120 provides connection to a computer network such as Ethernet, TCP/IP or other popular protocol network interfaces. Optional components for interfacing to external peripherals include: a Small Computer Systems Interface (SCSI) port 1122 for attaching peripherals; a PCMCIA slot 1124; and serial port 1126. An optional diskette drive 1128 is shown for loading or saving code to removable diskettes 1130 or equivalent computer readable media. For example, a CD-ROM drive 1130 could also be used in conjunction with removable CD-ROM disks 1130. The computer system 1000 may be implemented by combination of hardware and software. Moreover, the functionality required for using the invention may be embodied in computer-readable media (such as a 3.5 inch diskette or a CD-ROM disk or other computer readable media 1130) to be used in programming an information-processing apparatus (e.g., a personal computer) to perform in accordance with the invention.

Figure 11:
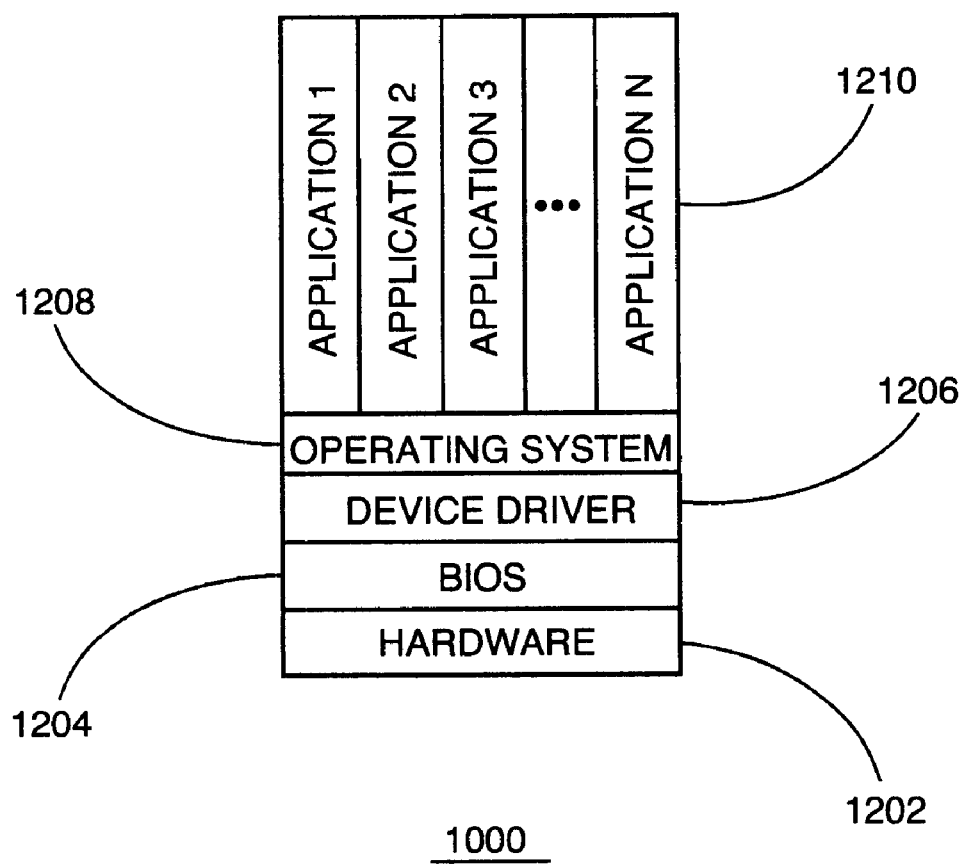
FIG. 11 is a block diagram illustrating software architecture for the computer system of FIG. 10.

FIG. 11 is a block diagram illustrating the software hierarchy for the computer system 1000 providing a preferred computing platform for the invoice processing server 202 according to a preferred embodiment of the present invention. The hardware 1202 is the computer system hardware (shown in FIG. 10) for the invoice processing server. The BIOS (Basic Input Output System) 1204 is a set of low level computer hardware instructions, usually stored in ROM 1112, for communications between an operating system 1208, device driver(s) 1206 and the hardware 1202. Device drivers 1206 are hardware specific code used to communicate between an operating system 1208 and hardware peripherals such as the mouse 1132, the diskette drive or CD ROM drive 1128, or a printer (not shown). Applications 1210 (such as the MicroEDI Application 220) are software applications written in C/C++, Java, assembler, or equivalent. The operating system 1208 is the master program that loads after the BIOS 1204 initializes the computer system 1000 and that interoperates with the software applications 1210 to control and run the hardware 1202. Examples of operating systems include DOS, Windows 3.1/95/98/NT, Unix, Macintosh, OS/2 and equivalent.

With reference to FIG. 2, again, the MicroEDI Server 202 can communicate with 10 the computer system 210 at the vendor site via a network server 212 that, in the preferred embodiment, is networkly coupled to the Internet 208. The network server 212 preferably comprises an Internet information server application running on a Windows NT operating system software which are commercially available from Microsoft, Inc., of Redmond, Wash. The MicroEDI Server 202 maintains information preferably stored in a MicroEDI Database 214. The MicroEDI Database 214 preferably comprises an SQL Server application software that is commercially available from Microsoft, Inc., of Redmond, Wash. The MicroEDI Database 214 normally stores invoice data 216 and other related reference data 218. The MicroEDI Server 202 can receive/transmit invoice data 216 and other related reference data 218 with the company's computer system 206 handling the accounting functions for the company. Additionally, the MicroEDI Server 202 can receive/transmit certain invoice data 216 from/to the computer system 210 at the vendor site. The MicroEDI Server 202 includes a MicroEDI application component 220 which handles the invoice processing functions for the MicroEDI Server 202, as will be more fully discussed below. Lastly, the MicroEDI Server 202 can be networkly coupled via either the Internet or a company's Intranet 222 with another computer system 224 for determining authorization of certain invoices for payment by an orphan release manager, as will be more fully discussed below. Payment authorization data 226 can be transmitted/received between the computer system 224 of the orphan release manager and the network server 212.

The MicroEDI server 202 preferably operates on a standard personal computer configured as a web application server that physically resides at a company's place of business. However, in alternative embodiments, the MicroEDI server could be based on other conventional computing platforms that would be capable of supporting a network applications server, such as a web application server in the preferred embodiment. Preferably the computing platform is located at a company's place of business.

The MicroEDI server 202 has a customized computing interface with the company's accounting computer system 206 which allows automated processing of invoices with no human intervention necessary. This differs significantly from prior art EDI systems which have generic computer interfaces that require modification of the accounting system 206 to be able to communicate. Typically, this modification is difficult and expensive to implement.

Another advantage that the MicroEDI Server 202 provides to an invoice processing system over the known prior art is that the MicroEDI Server 202 can receive invoice information from vendors to accept two types of invoices for processing. The first type of invoice is based on orders issued out of a company's purchasing computer system which typically is part of the company's accounting computer system 206. In this case, the invoice information received from a vendor computer system is validated in real-time before acceptance for posting in the company's accounting computer system. This type of invoice processing is directly dependent on previously generated (preexisting) orders, such as purchase orders, service orders, or work orders. These dependent invoices always have order reference information included with the dependent invoice. Prior art EDI invoice handling systems typically are only able to handle these types of dependent invoices where the order reference information, such as a purchase order number, is always included with the invoice information.

The present invention can also process invoices that do not have order reference information, such as the purchase order number. These types of invoices will be called orphan invoices hereinafter. The ability to handle orphan invoices is a significant advantage of the present invention that is not found in any known prior art EDI system. The ability of the MicroEDI server 202 to accept and automatically process orphan invoices allows vendors to invoice a company for items, such as products or services, that were provided to the company, without having to receive a purchase order. This is a very valuable feature of the present invention that is not available in the known prior art EDI systems because prior art systems have typically always required order reference information, or number, to process an invoice from a vendor.

Additionally, the MicroEDI Server 202 allows certain company personnel outside of the accounts payable operations to review and release received vendor orphan invoices via an independent Internet/Intranet interface operating via the orphan release manager computer system 224. No known prior art system provides this valuable capability for orphan invoice review and release by company personal prior to the invoice being submitted to the company's accounts payable computer system for payment. Clearly, an implementation including the MicroEDI Server 202 in a company's invoice processing system allows the company to proactively reduce and/or eliminate the volume of paper invoices received and processed. In this way, a company can significantly reduce the amount of employee overhead required to process the paper invoices and ultimately reduces overall costs of operations.

Figure 3:
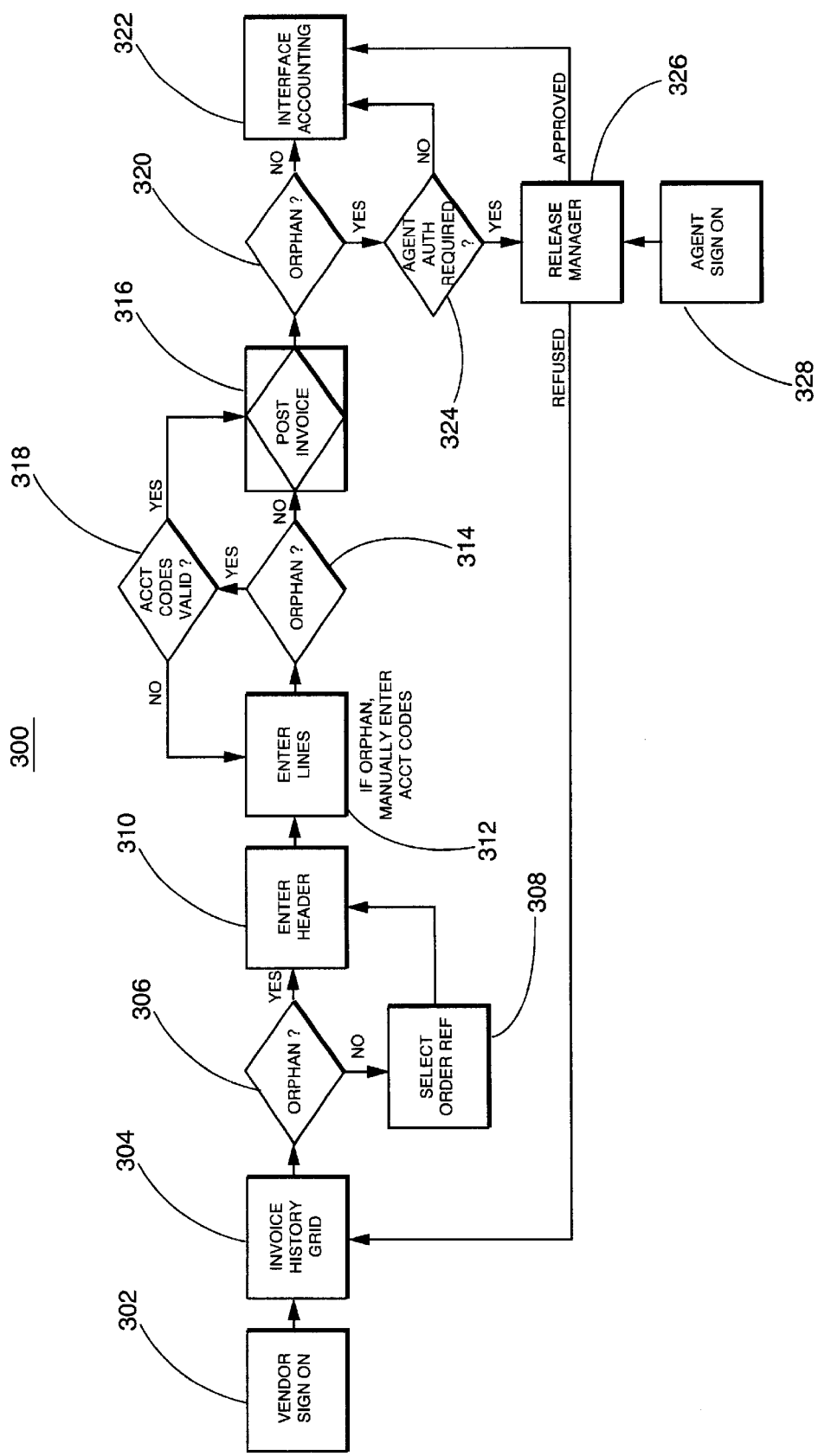
FIG. 3 is an operational flow diagram of the invoice processing system of FIG. 2 according to the preferred embodiment of the present invention.

Referring to FIG. 3, an exemplary flow diagram illustrates operations of the invoice processing system of FIG. 2, in accordance with a preferred embodiment of the present invention. A company can identify each of its vendors by vendor identification information such as a vendor ID number and a password. Each vendor can therefore communicate with the company invoice processing system 200, as shown in FIG. 2, to transmit/receive invoice data 216 to/from the MicroEDI Server 202. The vendor personnel, utilizing the vendor computer system 210, can sign on, at Step 302, into the MicroEDI Server 202 to begin processing invoice information. As part of the sign-on procedure, the vendor personnel identify the vendor, such as by its vendor identification number and password, to the MicroEDI Server 202. When the MicroEDI Server 202 authenticates the vendor ID number and password and determines that a user is authorized, the MicroEDI Server 202 provides an invoice history, preferably in a table or grid form, to the vendor user, such as for display at the vendor computer system 210.

An exemplary display of an invoice history grid is illustrated in FIG. 4. The invoice grid shown in FIG. 4 illustrates a number of invoices that are associated with the particular vendor that has signed on. Each invoice has a particular status assigned to it as shown on the last column of the grid. Additionally, invoices can be associated with preexisting order numbers, representing dependent invoices, or with no purchase order number (indicated by a zero) representing orphan invoices.

The vendor, via the vendor computer system 210, can select to view details of any one of the invoices displayed on the grid, add or change information in any of the incomplete invoices shown on the grid, or add a new invoice to its grid of invoices. When an invoice is in "posted" status, the invoice has been processed by the MicroEDI Server 202 and determined valid and submitted to the company accounts payable computer system 206 for payment processing. When an invoice is in "incomplete" status, the invoice still needs information from the vendor to be ready for validation and posting into the company accounts payable computer system 206. An invoice that has been assigned a "refused" status has been rejected for payment. And an invoice that is assigned "operational hold" status is being held from validation and posting until certain information and/or authorization can be obtained by the MicroEDI Server 202. Typically, an "operational hold" status for an invoice requires additional information or authorization to be entered into the MicroEDI Server 202 by company personnel.

When a vendor selects to add a new invoice, at Step 304, the vendor must enter an order reference information or select that no order reference information is available, at Step 306. If order reference information, such as a purchase order number, is available, then the invoice is considered a dependent invoice and the MicroEDI Application 220 in the MicroEDI Server 202 matches an order reference information to the current invoice being entered by vendor, at Step 308.

In the preferred embodiment, this order entry step can be simplified by providing a display at the vendor computer system 210 that shows all open orders between the company and the vendor, as illustrated in FIG. 5. To select an open order, the vendor can, for example, move a mouse cursor over one of the purchase order numbers shown in FIG. 5 and then click a mouse button to make the selection. Then, for example, by moving the mouse cursor over the "Use Selected Order Number" button on a display screen and then clicking the mouse button, the vendor has selected one of the open order numbers displayed on the screen. The MicroEDI Server 202 stores information, as discussed above, in the MicroEDI Database 214. This stored information includes order information associated with each vendor for the company as received from the company accounting system 206 and stored in the MicroEDI Database 214. This purchase order information is considered part of the reference data 218 that is exchanged between the company accounting computer system 206 and the MicroEDI Database 214 via the local area network 204.

The MicroEDI Application 220 can then provide information to the vendor computer system 210 to display a prompt to the vendor requesting certain invoice header information as shown in FIG. 6. For example, the vendor is prompted to enter invoice reference information, such as an invoice number. Other information that may be requested from the vendor includes an invoice date, sales tax information, shipping and handling cost information, an invoice total cost information, destination information, such as a zip code for destination, and other relevant information required to create an invoice header. The vendor, at Step 310, is prompted to enter the necessary information to create an invoice header.

The vendor then, at Step 312, is prompted to enter invoice information for specific line items that match a previously entered order. In the preferred embodiment, as shown in FIG. 7, the vendor computer system 210 displays a grid of order line items from an existing purchase order in the system allowing the vendor to select specific order line items to include in the particular invoice being completed. The line item entry process continues, at Step 312, until the vendor determines that the invoice information is complete. Then, after the vendor completes entry of all line items in the invoice being entered, the MicroEDI Application 220 determines, at Step 314, whether the invoice is an orphan invoice or a dependent invoice. If the invoice is a dependent invoice, such as the one in this example, the MicroEDI Application 220 attempts to post the invoice, at Step 316, to the company accounting system 206 for the accounts payable computer in the company accounting system 206 to handle the payment of the invoice. Because the invoice is a dependent invoice and not an orphan invoice, at Step 320, the posting of the dependent invoice is immediately transmitted via the local area network 204 to the company accounts payable computer system 206, at Step 322. No additional validation is required to post the dependent invoice to the company accounting system 206 because all line items of the invoice match an existing purchase order in the company system as stored in the MicroEDI Database 214 and the other parameters of the invoice such as the total amount invoiced meet certain company authorization criteria based on the referenced data 218 that has been stored in the MicroEDI Database 214 for a particular purchase order associated with the invoice being processed.

Alternatively, at Step 306, if the vendor selects to enter a new orphan invoice, then the MicroEDI Application 220 provides information to the vendor computer system 210 to prompt the vendor to enter an orphan invoice header information, at Step 310. In the preferred embodiment, the vendor being prompted with the invoice history grid shown in FIG. 4 can select to add a new invoice entry by clicking the mouse cursor on the add button on the screen being displayed, and then when prompted for a selection of an open order number, such as shown in FIG. 5, selecting the "No Order Number Provided" button on the screen to begin entry of an orphan invoice. The vendor at Step 310 then enters the required orphan invoice information, such as shown in FIG. 8.

In particular, the vendor is required to identify an authorizing agent of the company who authorized the vendor to provide product or service to the company. The authorizing agent for the company is identified by name, date when service or product was provided to the company, by phone number, by fax number, by e-mail address, and by any other relevant identification information for the MicroEDI Server 202 to be able to validate the orphan invoice with the particular authorizing agent as identified by the vendor.

After the vendor has completed an orphan invoice header, at Step 310, the vendor can then continue by entering all line items that it desires to enter for the orphan invoice, at Step 312. In particular, while entering each line item, at Step 312, the vendor will be prompted for specific company information that identifies the line item to the company accounting computer system 206. For example, as shown in FIG. 9, the vendor is prompted to enter specific accounting codes 902 for the particular line item for the orphan invoice. These accounting codes would be provided to the vendor by the company personnel, such as the authorizing agent, to allow the vendor to complete an invoice to request payment. After entering line items, at Step 312, the orphan invoice, at Step 314, is then validated to determine that all line items meet company parameters including valid accounting codes, at Step 318. If the accounting codes are not valid, at Step 318, then the vendor is prompted at Step 312 to re-enter the correct accounting codes for the particular line items. However, if the accounting codes are valid, at Step 318, then the orphan invoice is complete and ready to begin a posting process, at Step 316. To post the invoice, at Step 316, if the invoice is determined to be an orphan invoice at Step 320, such as in this case, then an authorization may be required from an authorizing agent for the company, at Step 324. For example, invoices identifying a particular authorizing agent and that request a total invoice dollar amount below a predetermined threshold (for example, below $500) are automatically authorized as long as all other information is determined valid for the particular orphan invoice. In such a case, at Step 324, the MicroEDI Application 220 completes the posting operation by transmitting the completed orphan invoice to the company accounts payable computer system 206 vis-a-vis local area network 204, at Step 322.

On the other hand, if an authorization from the authorizing agent for the company is required, at Step 324, the MicroEDI Application 220 looks up the contact information for the specified authorizing agent for the company as stored in the MicroEDI Database 214 and then the MicroEDI Application 220 can initiate a message to be transmitted to the authorizing agent for the company. The message can be transmitted to the authorizing agent via, for example, an electronic mail message that is coupled through the network server 212 and the Internet/Intranet 222 network interface to notify the authorizing agent for the company, such as at a computer system 224, that a particular orphan invoice requires a release authorization. Alternatively, the MicroEDI Application 220 can initiate a message transmission via alternative modes of communication. For example, a facsimile document can be sent to a predetermined fax telephone number, or a voice mail message can be delivered to a voice mail account for the authorizing agent for the company, or a page message can be coupled to a paging system via the Internet/Intranet 222 network interface to wirelessly transmit the page message to the pager of the authorizing agent for the company, or alternatively the message can be delivered via other conventional means of delivering a message to the authorizing agent for the company. The message notifies the authorizing agent that the orphan invoice is waiting for their approval using the orphan release manager function to authorize payment.

After the authorizing agent is notified, at Step 324, the authorizing agent signs onto the MicroEDI Server 202, at Step 328. In the preferred embodiment, the authorizing agent utilizes a computer system 224 with a web browser to communicate with the MicroEDI Server 202 providing a web page server, such as via an Internet communication interface or an Intranet communication interface 222. After the authorizing agent signs on, at Step 328, the authorizing agent (or orphan release manager) provides a payment authorization signal (such as entering payment authorization information 226) at Step 326 to instruct the MicroEDI Application 220 to authorize payment on a particular invoice. Alternatively, the orphan release manager via the computer system 224 can instruct the MicroEDI Application 220 to refuse payment authorization for the particular orphan invoice. If the orphan invoice is approved for payment, at Step 326, then the MicroEDI Application 220 transmits a payment authorization signal, preferably including certain orphan invoice information, via the local area network 204 to the company accounts payable computer system 206 to post the orphan invoice into the company accounting system for immediate payment processing. On the other hand, if the orphan invoice is refused payment authorization, at Step 326, then the invoice status is set to refused, at Step 304, and shown to the vendor on the invoice history grid, for example, as illustrated in FIG. 4. In this way, the vendor would be informed of a refusal to authorize payment and the vendor would then have to communicate with the company and the particular authorizing agent for the company to resolve any dispute with respect to payment.

Additionally, certain authorizing agents may be new to the company accounting computer system requiring verification by someone in the accounting department before allowing the particular company agent to authorize any orphan invoice. In such a case, at Step 326, the MicroEDI Application 220 would verify in the MicroEDI Database 214 that the particular authorizing agent identified in the orphan invoice has not authorized any invoice for the company in the past. Consequently, the MicroEDI Application 220 would send a message to a secure agent for the company, such as a member of the company accounting system personnel, requesting validation of the particular authorizing agent identified in the orphan invoice before accepting any authorization instructions from the new authorizing agent. The message, for example, could be sent to a predetermined accounting department personnel via an electronic mail message, a voice mail message to a voice mail account, or a page message wirelessly transmitted to an accounting department personnel's pager. The accounting department personnel would need to respond to the validation request message by sending agent validation information, such as by entering validation information into the MicroEDI Database 214 from a computer system communicating via the Internet/Intranet communication interface 222, to then allow the MicroEDI Application 220 to send a message to the authorizing agent for the company, at Step 326, to request payment authorization for the particular orphan invoice. This additional security feature allows, for example, the accounting department personnel to validate an authorizing agent for the company at least for a first transaction before allowing authorization of orphan invoices by the particular authorizing agent for the company.

Therefore, as has been described above, the present invention provides many significant advantages over the known prior art EDI invoice processing systems. It significantly reduces the complexity and the cost of implementing an invoice processing system for communicating and validating invoice information between a company and its pool of vendors. By reducing the cost in complexity of implementing an invoice entry and validation processing system, the present invention makes electronic data interchange for invoice processing a cost effective and reasonably obtainable solution for almost every company that handles purchasing via invoicing documents.

While the invention has been described in its preferred embodiment with some degree of particularity, it is understood that this description has been given only by way of example and that many variations can be made thereto without departing from the spirit and scope of the invention as set forth in the claims below.

What is claimed is:

1. An invoice processing system comprising:
   at least one computer system operated by at least one vendor, the at least one computer system being operable to enter invoice information corresponding to an invoice, the invoice information not including buyer order reference data;
   an invoice release device, the invoice release device being operable by an authorizing agent to generate a first payment authorization signal if payment of the invoice is being authorized;
   an invoice processing server, the invoice processing server being operable to:
   receive the invoice information from the at least one computer system;
   validate the invoice information;
   determine if the invoice is authorized for payment processing, the invoice being authorized for payment if the first payment authorization signal is received from the invoice release device; and
   generate a second payment authorization signal to initiate processing payment of the invoice in response to determining that the invoice is authorized for payment for the at least one vendor.

2. The invoice processing system of claim 1, further comprising:
   an accounting computer system networkly coupled to the invoice processing server and responsive to the second payment authorization signal generated therein to initiate payment processing of invoices determined authorized for the at least one.

3. The invoice processing system of claim 2, wherein the second payment authorization signal is received in the accounting computer system via a computer network interface with the invoice processing server.

4. The invoice processing system of claim 1, wherein the invoice information includes an authorizing agent and wherein the invoice processing server is further operable to determine that the invoice is authorized for processing if a total invoice amount is less than a predetermined amount.

5. The invoice processing system of claim 1, wherein the invoice information includes an authorizing agent and wherein the invoice processing server is further operable to notify the authorizing agent to determine if the invoice is authorized for processing.

6. A method for processing invoices comprising the steps of:
   (a) receiving invoice information from a vendor, the invoice information not including buyer order reference data;
   (b) creating an invoice on an invoice processing server;
   (c) receiving a first payment authorization signal from an invoice release device operated by an authorizing agent if payment of the invoice is being authorized;
   (d) validating the invoice information;
   (e) determining if the invoice is authorized for payment processing, the invoice being authorized for Payment processing if the first payment authorization signal is received; and
   (f) generating a second payment authorization signal corresponding to the invoice determined authorized for payment processing.

7. The method for processing invoices of claim 6, wherein step (d) further comprises the steps of:
   determining that the invoice information identifies an authorizing agent;
   determining that the authorizing agent has unknown authority to authorize the invoice for payment
   receiving agent validation information from a secure agent to validate that the authorizing agent has authority to authorize the invoice for payment; and
   in response to receiving agent validation information from the secure agent, sending a message to the authorizing agent requesting payment authorization to validate the invoice information.

8. The method for processing invoices of claim 6, wherein step (d) further comprises the step of:
   sending a message to an authorizing agent requesting payment authorization to validate the invoice information.

9. The method for processing invoices of claim 8, wherein the first payment authorization signal is received by the invoice processing server via a computer network interface.

10. The method for processing invoices of claim 9, wherein the computer network interface comprises a web page server in the invoice processing server and a web browser in the invoice release device.

11. The method for processing invoices of claim 6, wherein step (d) further comprises the steps of:
   determining that the invoice information identifies an authorizing agent;
   determining that the authorizing agent has unknown authority to authorize the invoice for payment;
   receiving agent validation information from a secure agent to validate that the authorizing agent has authority to authorize the invoice for payment; and
   in response to receiving agent validation information from the secure agent, sending a message to the authorizing agent requesting payment authorization to validate the invoice information.

12. A computer readable storage medium storing executable program instructions for performing operations in a computer processing unit in an invoice processing server, the program instructions comprising instructions for:
   receiving invoice information from a vendor via a network interface to create an invoice at the invoice processing server, the invoice information not including buyer order reference data;
   validating the invoice information;
   determining if the invoice is authorized for payment processing, the invoice being authorized for payment processing if a first payment authorization signal is received from an invoice release device operated by an authorizing agent; and
   providing a second payment authorization signal to authorize payment processing for the invoice determined authorized for payment processing.

13. The computer readable storage medium storing executable program instructions of claim 12, the program instructions further comprising instructions for receiving the first payment authorization signal from the invoice release device.

14. The computer readable storage medium storing executable program instructions of claim 4, the program instructions further comprising instructions for:
   sending a message to an authorizing agent requesting payment authorization to validate the invoice information; and
   receiving the first payment authorization signal from the invoice release device to validate the invoice information.

15. The computer readable storage medium storing executable program instructions of claim 12, the program instructions further comprising instructions for:
   determining that the invoice information identifies an authorizing agent;
   determining that the authorizing agent has unknown authority to authorize die invoice for payment;
   receiving agent validation in formation from a secure agent to validate that the authorizing agent has authority to authorize the invoice for payment; and
   in response to receiving agent validation information from the secure agent, sending a message to the authorizing agent requesting payment authorization to validate the invoice information.

16. The computer readable storage medium storing executable program instructions of claim 12, wherein the invoice information includes an authorizing agent and wherein the program instructions further comprise instructions for:
   determining that the invoice is authorized for processing if a total invoice amount is less than a predetermined amount.

17. The computer readable storage medium storing executable program instructions of claim 12, wherein the invoice information includes an authorizing agent and wherein the program instructions further comprise instructions for:
   notifying the authorizing agent to determine if the invoice is authorized for processing.

18. The computer readable storage medium storing executable program instructions of claim 17, wherein the program instructions further comprise instructions for receiving the first payment authorization signal from the invoice release device.

19. The computer readable storage medium storing executable program instructions of claim 18, wherein the program instructions further comprise instructions for notifying the vendor if the invoice has not been authorized for processing.

* * * * *